United States Patent
Lee et al.

(10) Patent No.: US 12,192,075 B2
(45) Date of Patent: Jan. 7, 2025

(54) METHOD AND DEVICE FOR PROVISIONING BIDIRECTIONAL FILTER IN PFD MANAGEMENT PROCEDURE

(71) Applicant: SAMSUNG ELECTRONICS CO., LTD., Suwon-si (KR)

(72) Inventors: Jeonghwa Lee, Suwon-si (KR); Euikyum Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/368,418

(22) Filed: Sep. 14, 2023

(65) Prior Publication Data
US 2024/0031257 A1    Jan. 25, 2024

Related U.S. Application Data

(63) Continuation of application No. PCT/KR2021/003158, filed on Mar. 15, 2021.

(30) Foreign Application Priority Data

Mar. 15, 2021  (KR) .................. 10-2021-0033158

(51) Int. Cl.
  *H04L 43/028* (2022.01)
  *H04L 43/062* (2022.01)
  *H04L 67/14* (2022.01)
(52) U.S. Cl.
  CPC .......... *H04L 43/028* (2013.01); *H04L 43/062* (2013.01); *H04L 67/14* (2013.01)
(58) Field of Classification Search
  CPC ..... H04L 43/028; H04L 43/062; H04L 67/14; H04L 65/40
  See application file for complete search history.

(56) References Cited

U.S. PATENT DOCUMENTS

| 9,306,818 | B2 | 4/2016 | Aumann et al. |
| 9,392,531 | B2 | 7/2016 | Pinheiro et al. |

(Continued)

FOREIGN PATENT DOCUMENTS

| CN | 106255148 A | 12/2016 |
| CN | 111163495 A | 5/2020 |

(Continued)

OTHER PUBLICATIONS

International Search Report (PCT/ISA/210) issued Dec. 13, 2021 by the International Searching Authority in counterpart International Patent Application No. PCT/KR2021/003158.

(Continued)

*Primary Examiner* — Oanh Duong
(74) *Attorney, Agent, or Firm* — Sughrue Mion, PLLC

(57) ABSTRACT

The present disclosure provides methods and apparatuses for provisioning a bidirectional filter. In some embodiments, a method of a first network entity performing a session management function (SMF) in a communication system includes obtaining a first filter for a first direction and a second filter for a second direction that are associated with an application, identifying whether the first filter is a bidirectional filter based on a result of comparing the first filter and the second filter, identifying whether a second network entity performing a user plane function (UPF) supports a function of obtaining the second filter, based on the first filter being identified as the bidirectional filter, and transmitting, to the second network entity, a first message including the first filter and information indicating that the first filter is the bidirectional filter, based on identifying that the second network entity supports the function of obtaining the second filter.

20 Claims, 12 Drawing Sheets

(56) References Cited

U.S. PATENT DOCUMENTS

| | | |
|---|---|---|
| 9,609,647 B2 | 3/2017 | You et al. |
| 9,749,895 B2 | 8/2017 | Phan et al. |
| 10,602,538 B2 | 3/2020 | LOee et al. |
| 10,693,918 B2 | 6/2020 | Verma et al. |
| 2016/0269104 A1 | 9/2016 | Lee et al. |
| 2019/0357082 A1 | 11/2019 | Kim et al. |
| 2020/0128503 A1 | 4/2020 | Li et al. |
| 2020/0154350 A1* | 5/2020 | Dao ............... H04W 48/18 |
| 2021/0282048 A1 | 9/2021 | Lee |
| 2021/0329485 A1 | 10/2021 | Han et al. |
| 2021/0360501 A1 | 11/2021 | Jin et al. |
| 2022/0377645 A1* | 11/2022 | Muoz De La Torre Alonso ......... H04L 41/0895 |
| 2022/0417121 A1* | 12/2022 | Muoz De La Torre Alonso ......... H04L 41/142 |
| 2023/0133781 A1* | 5/2023 | Yao ............... H04L 12/1407 455/406 |

FOREIGN PATENT DOCUMENTS

| | | |
|---|---|---|
| CN | 111465062 A | 7/2020 |
| CN | 111465063 A | 7/2020 |
| EP | 1 884 037 B1 | 8/2016 |
| EP | 3 101 944 B1 | 1/2020 |
| KR | 10-2019-0132921 A | 11/2019 |
| KR | 10-2020-0018220 A | 2/2020 |
| KR | 10-2167343 B1 | 10/2020 |
| KR | 10-2207786 B1 | 1/2021 |
| KR | 10-2366709 B1 | 2/2022 |
| WO | 2014/051322 A1 | 4/2014 |
| WO | 2014/161175 A1 | 10/2014 |
| WO | 2015/069065 A1 | 5/2015 |
| WO | 2016/048100 A1 | 3/2016 |
| WO | WO-2020019991 A1 * | 1/2020 ......... H04L 41/0893 |
| WO | 2020/041368 A1 | 2/2020 |
| WO | WO-2023035894 A1 * | 3/2023 ......... H04L 65/1069 |

OTHER PUBLICATIONS

Written Opinion (PCT/ISA/237) issued Dec. 13, 2021 by the International Searching Authority in counterpart International Patent Application No. PCT/KR2021/003158.

3rd Generation Partnership Project; Technical Specification Group Core Network and Terminals; Interface between the Control Plane and the User Plane Nodes; Stage 3, (Release 16), 3GPP TS 29.244, V16.6.0, Dec. 2020. (318 pages total).

"3rdGeneration Partnership Project; Technical Specification Group Core Network and Terminals; Policy and Charging Control (PCC); Reference points", (Release 16), 3GPP TS 29.212 V16.4.0, Sep. 2020. (287 pages total).

Ericsson et al., "Filter ID", 3GPP TSG-CT WG4 Meeting #102e, E-Meeting, Feb. 24, 2021-Mar. 5, 2021, C4-211630. (23 pages total).

3GPP, "5G; NR; Overall description; Stage-2", ETSI TS 138 300, V15.2.0, Sep. 2018. (86 pages total).

5G PPP, "View on 5G Architecture", 5G PPP Architecture Working Group, Version 3.0, Jun. 19, 2019. (166 pages total).

* cited by examiner

METHOD AND DEVICE FOR PROVISIONING BIDIRECTIONAL FILTER IN PFD MANAGEMENT PROCEDURE

CROSS-REFERENCE TO RELATED APPLICATIONS

This application is a continuation application of International Application No. PCT/KR2021/003158, filed on Mar. 15, 2021, which claims priority to Korean Patent Application No. 10-2021-0033158, filed on Mar. 15, 2021, in the Korean Intellectual Property Office, the disclosures of which are incorporated by reference herein in their entireties.

BACKGROUND

1. Field

The present disclosure relates generally to an operation between a session management function (SMF) of a control plane and a user plane function (UPF) of a user plane in a core network of a next-generation mobile communication system. More particularly, the present disclosure relates to a method for the SMF providing a filter for detecting application traffic to the UPF.

2. Description of Related Art

Efforts may be being made to develop an improved 5th generation (5G) communication system and/or a pre-5G communication system that may meet an increasing demand for wireless data traffic after commercialization of a 4th generation (4G) communication system. For this reason, a 5G communication system and/or a pre-5G communication system may be referred to as a communication system after the 4G network (e.g., Beyond 4G Network) and/or system after the Long Term Evolution (LTE) system (e.g., Post LTE). In order to potentially achieve a high data rate, a related 5G communication system may be considered for implementation in a super high frequency band (e.g., such as, but not limited to, a 60 gigahertz (GHz) band, a millimeter wave (mmWave) band (e.g., 24-300 GHz), and/or an extremely high frequency (EHF) band).

However, such frequency bands may typically exhibit a higher path loss and/or a decreased transmission distance, when compared to other wireless communication systems. As such, related 5G communication systems may attempt to alleviate the path loss of radio waves in the super high frequency band and/or increase the transmission distance of radio waves by employing techniques, such as, but not limited to, beamforming, massive multiple-input multiple output (MIMO), full dimensional MIMO (FD-MIMO), array antennas, analog beam-forming, and/or large scale antenna technologies.

Alternatively or additionally, the related 5G communication systems may attempt to improve the network architecture of the system by employing technologies such as, but not limited to, evolved small cell, advanced small cell, cloud radio access network (cloud RAN), ultra-dense network, device-to-device communication (D2D), wireless backhaul, moving network, cooperative communication, coordinated multi-points (COMP), interference cancellation, and the like. Furthermore, the related 5G communication systems may employ an advanced coding modulation (ACM) method (e.g., hybrid frequency shift keying (FSK) and quadrature amplitude modulation (QAM) modulation (FQAM), sliding window superposition coding (SWSC), and/or an advanced connection technology (e.g., filter bank multi carrier (FBMC), non-orthogonal multiple access (NOMA), sparse code multiple access (SCMA), and the like).

Meanwhile, the Internet may be evolving from a human-centered network in which humans may generate and consume information to an Internet of Things (IoT) network that may exchange and/or process information between distributed components (e.g., an object, and the like). Internet of Everything (IoE) technology, which may combine big data processing technology, and the like through connection with a cloud server, and the like with IoT technology, may also be emerging. In order to implement IoT devices and/or networks, technology elements such as sensing technology, wired and wireless communication and network infrastructure, service interface technology, and security technology may be needed. To that end, technologies for connections between objects such as, but not limited to, a sensor network, machine-to-machine (M2M) communication, and machine type communication (MTC), and the like, may have been explored.

For example, an IoT environment may provide an intelligent internet technology service that may create a new benefit in human activities by collecting and/or analyzing data generated from connected objects. As such, IoT environments may be applied to a variety of fields such as, but not limited to, smart homes, smart buildings, smart cities, smart and/or connected cars, smart grids, health care, smart home appliances, advanced medical services, and the like, through convergence and/or combination between an existing information technology and various industries.

Accordingly, attempts may be made to apply a 5G communication system and/or technologies to an IoT network. For example, technologies such as, but not limited to, sensor networks, M2M communication, MTC, and the like may be implemented by using techniques such as, but not limited to, beamforming, MIMO, array antennas, and the like, which may have been originally developed as 5G communication technologies. The application of a cloud cloud RAN as a big data processing technology may be another example of the convergence of 5G technology and IoT technology.

Meanwhile, in line with the above-described technical developments, a structure of a core network of the communication system may have been discussed. For example, in an existing LTE communication system, a mobility management entity (MME) may be responsible for a mobility management function and a session management function, a packet data network gateway (P-GW) that may perform functions such as, but not limited to, delivering packets between a terminal and an external packet data network (PDN), charging according to data usage, and the like, and a serving gateway (S-GW) that may perform functions such as, but not limited to, routing user packets between a base station and the P-GW, and the like, may configure an evolved packet core (EPC), which may be referred to as a core network. Since the MME, the P-GW, and the S-GW configuring the EPC may be network entities in which a control plane function and a user plane function may be closely combined, flexible network management may be difficult.

Meanwhile, telecommunication standards (e.g., Third Generation Partnership Project (3GPP) Release 14) may promulgate a structure of control and user plane separation (CUPS) that may separate the control plane and the user plane of the P-GW and the S-GW of the EPC using a software defined network (SDN) technology. Subsequently, the CUPS structure may be applied to the structural design of the 5G core network (5GC). Consequently, separation between the control plane and the user plane may be achievable in the 5G core network. That is, the separation between the control plane and the user plane may be achieved as the structure in which authentication, access control, and mobility control functions of EPC MME may be performed by the 5GC access and mobility management function (AMF), in terms of the control plane, the session management function of the EPC MME may be performed by the 5GC session management function (SMF), and packet processing, and the like of the EPC GW may be performed by the 5GC user plane function (UPF) in terms of the user plane.

Accordingly, exists a need for further improvements in methods for reducing the function and implementation complexity of the AMF and the SMF processing the control plane, the UPFs processing the user plane, and the signaling load between network entities.

In the above-described related 5GC, an SMF of a control plane may provide a plurality of filters to the UPF so that a UPF of a user plane may detect application traffic. In a related 5G communication system, the number of applications that may be serviced may have increased significantly when compared to an existing LTE communication system. Alternatively or additionally, as a traffic type of the above application may have also diversified, the number of filters to be defined in order to detect one application may have increased significantly. However, since the length of messages that may be transmitted and received through the interface between the SMF and the UPF is limited, the number of filters that may be delivered to the UPF through one message is limited. If, in a case that the UPF may be diverse and a sufficient number of filters may not be provided, traffic of the application may not be properly detected, accordingly, an abnormal network situation may be caused.

SUMMARY

Accordingly, the present disclosure proposes a method for addressing the above-described limitation in providing the user plane function (UPF) with the filter used for detecting traffic of the application by the session management function (SMF).

According to an aspect of the present disclosure, a method of a first network entity performing an SMF in a communication system is provided. The method includes obtaining a first filter for a first direction and a second filter for a second direction, the first filter and the second filter being associated with an application, identifying whether the first filter is a bidirectional filter based on a result of comparing the first filter and the second filter, identifying whether a second network entity performing an UPF supports a function of obtaining the second filter, based on the first filter being identified as the bidirectional filter, and transmitting, to the second network entity, a first message including the first filter and information indicating that the first filter is the bidirectional filter, based on identifying that the second network entity supports the function of obtaining the second filter.

According to an aspect of the present disclosure, a method of a second network entity performing an UPF in a communication system is provided. The method includes receiving a first message including a first filter for a first direction associated with an application from a first network entity performing an SMF, identifying a second filter for a second direction based on information of the first filter, based on the first message indicating that the first filter is a bidirectional filter, and detecting traffic of the application based on the first filter and the second filter.

According to an aspect of the present disclosure, a first network entity that performs an SMF in a communication system is provided. The first network entity includes a transceiver and a controller controlling the transceiver. The controller is configured to obtain a first filter for a first direction and a second filter for a second direction, the first filter and the second filter being associated with an application, identify whether the first filter is a bidirectional filter based on a result of comparing the first filter and the second filter, identify whether a second network entity performing an UPF supports a function of obtaining the second filter, based on the first filter being identified as the bidirectional filter, and transmit, to the second network entity, a first message including the first filter and information indicating that the first filter is the bidirectional filter, based on identification that the second network entity supports the function of obtaining the second filter.

According to an aspect of the present disclosure, a second network entity performing an UPF in a communication system is provided. The second network entity includes a transceiver and a controller controlling the transceiver. The controller is configured to receive, via the transceiver, a first message including a first filter for a first direction associated with an application from a first network entity performing an SMF, identify a second filter for a second direction based on information of the first filter, based on the first message indicating that the first filter is a bidirectional filter, and detect traffic of the application based on the first filter and the second filter.

According to the present disclosure, a method is provided for an SMF to efficiently provide the UPF with a filter used to detect traffic of an application.

According to an embodiment of the present disclosure, a method is provided in which the SMF transmits a plurality of packet flow descriptions (PFDs) to the UPF, each PFD including a plurality of filters for detecting traffic of the application through the PFD management procedure, in a case that the filter may be applied in both directions (e.g., uplink direction and downlink direction), and/or the SMF delivers only the PFD including the filter for either direction. Accordingly, the UPF may prevent the transmission and reception of duplicate information by being able to derive a filter for another direction from a filter for any one direction included in the received PFD. Alternatively or additionally, when a network operator sets a larger number of filters for one application and provides them to the UPF, the aspects presented herein may provide for the implementation of a more efficient system when compared to related communication systems.

The effects that may be obtained from the present disclosure may not be limited to those described herein, and any other effects not mentioned herein are to be clearly understood by those having ordinary knowledge in the art to which the present disclosure belongs, from the following description.

BRIEF DESCRIPTION OF THE DRAWINGS

The above and other aspects, features, and advantages of certain embodiments of the present disclosure may become more apparent through the following description taken in conjunction with the accompanying drawings, in which.

DETAILED DESCRIPTION

Figure 1:
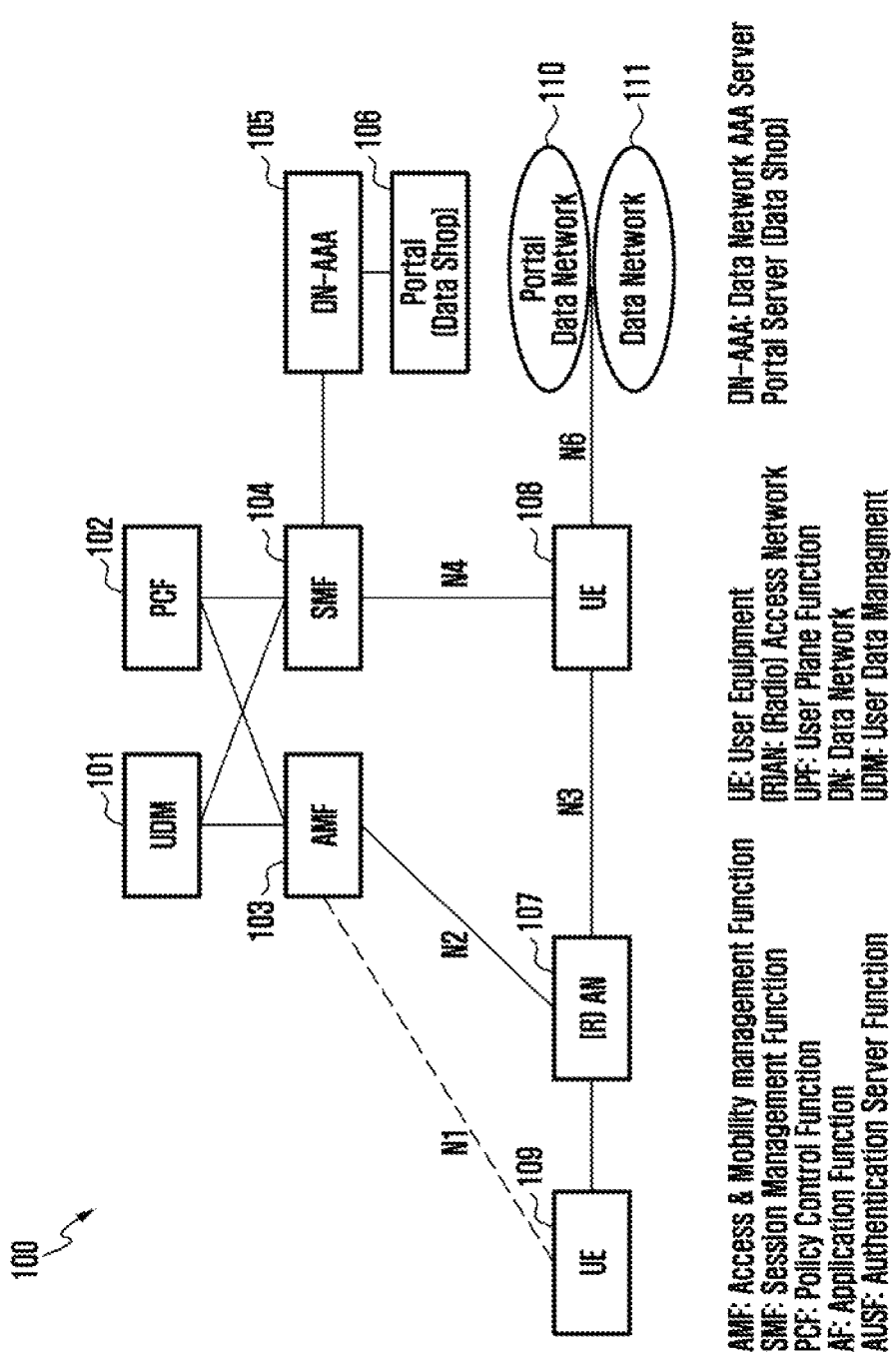
FIG. 1 is a diagram illustrating a structure of a 5th generation (5G) core network 5GC, according to an embodiment of the present disclosure.

Hereinafter, various embodiments of the present disclosure are described with reference to the accompanying drawing.

In the present disclosure, a description of technical content that may be well known in the technical field to which the present disclosure belongs and may not be directly related to the present disclosure may be omitted. This is to convey the gist of the present disclosure more clearly without blurring by omitting an unnecessary description.

For at least similar reasons, some components may be exaggerated, omitted, or schematically illustrated in the accompanying drawings. Alternatively or additionally, the size of each component may not fully reflect the actual size. The same reference number may be assigned to the same and/or corresponding components in each drawing.

An advantage and a feature of the present disclosure and a method for achieving them may become apparent with reference to embodiments described below in detail together with the accompanying drawings. However, the present disclosure is not limited to the embodiments disclosed below, but may be implemented in various forms. That is, the following embodiments are provided so that the disclosure may be complete, and to fully inform those of ordinary skill in the technical field to which the present disclosure belongs to the scope of the invention. The present disclosure may be defined by the scope of the claims.

It is to be understood that each block of processing flowchart drawings and combinations of flowchart drawings may be performed by computer program instructions. Since these computer program instructions may be mounted on a processor of a general-purpose computer, a special purpose computer, or other programmable data processing equipment, the instructions performed through the processor of the computer or other programmable data processing equipment may generate a mean to perform the functions described in the flowchart blocks. Since these computer program instructions may also be stored in a computer-usable and/or computer-readable memory that may aim a computer or other programmable data processing equipment to implement a function in a particular method, the instructions stored in the computer-usable and/or computer-readable memory may be produced as manufactured items including instruction means that may perform functions described in the flowchart blocks. Since the computer program instructions may be mounted on a computer or other programmable data processing equipment, instructions for performing a computer or other programmable data processing equipment by performing a series of operational steps on a computer or other programmable data processing equipment and generating a computer-executed process may provide steps to execute the functions described in the flowchart blocks.

In addition, each block may represent a module, segment, or a part of code including one or more executable instructions for executing a specific logical functions. It should also be noted that, in some alternative implementation examples, the functions described in the blocks may occur out of order. For example, two blocks illustrated in succession may be performed substantially simultaneously, and/or that the blocks may be performed in reverse order according to the corresponding function.

As used herein, the term '~ unit' may refer to software and/or hardware components such as, but not limited to, a field programmable gate array (FPGA) and an application specific integrated circuit (ASIC), and the '~ unit' performs certain roles. However, the '~ unit' may not limited to software and/or hardware. For example, the '~ unit' may be configured to be in an addressable storage medium and/or may be configured to execute on one or more processors. Thus, as an example, the '~ unit' may comprise software components, object-oriented software components, components such as, but not limited to, class components and task components, processes, functions, attributes, procedures, subroutines, segments of program code, drivers, firmware, microcode, circuits, data, database, data structures, tables, arrays, and variables. The functions provided in components and '~ unit's may be combined into a smaller number of components and/or '~ unit's and/or may be further separated into additional components and '~ unit's. Alternatively or additionally, the components and the '~ unit's may be implemented to execute on one or more processors (e.g., central processing units (CPUs)) in a computing device and/or storage device (e.g., secure multimedia card (secure MMC)). Alternatively or additionally, in an embodiment, the '~ unit' may comprise one or more processors.

It is to be understood that singular expressions, such as "above," "on," "below," "under," "beneath," and the like, may also include plural expressions unless clearly indicated otherwise.

Alternatively or additionally, terms including ordinal numbers, such as first, second, and the like may be used to describe various components, but the components may not be limited by the terms. The terms are used only for the purpose of distinguishing one component from another component. For example, a first component may be termed a second component, and similarly, a second component may be termed a first component, without departing from the scope of the present disclosure.

In addition, as used herein, the term "and/or" may include a combination of a plurality of related described items, or any item among a plurality of related described items. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

In addition, a term used in an embodiment of the present disclosure may be used only to describe a specific embodiment, and may not be intended to limit the present disclosure. A singular expression may include a plural expression unless it is explicitly meant differently in the context. In the present disclosure, it should be understood that terms such as "including" or "have" may be intended to designate that a feature, a number, a step, an operation, a component, a part, or combinations thereof described in the disclosure exist, and may not pre-preclude the presence or additional possibility of one or more other features or a number, a step, an operation, a component, a part, or any combination thereof.

In addition, terms such as "associated with" and "associated therewith" and derivatives thereof may refer to terms such as include, be included within, interconnect with, contain, be contained within, connect to or with, couple to or with, be communicated with, cooperate with, interleave, juxtapose, be proximate to, be bound to or with, have, have a property of, and the like.

In addition, as used herein, conditions described as "equal to or greater than" may be replaced with "greater than", conditions described as "equal to or less than" may be replaced with "less than", and/or conditions described as "equal to or greater than or less than" may be replaced with "greater than or equal to or less than".

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Prior to a detailed description of the present disclosure, examples of an interpretable meaning of several terms used in the present disclosure were presented. However, it should be noted that the present disclosure is not limited to the interpretation examples presented above.

Hereinafter, a method for providing a bidirectional filter proposed in the present disclosure and a device capable of performing the same is described.

FIG. 1 is a diagram illustrating a structure of a 5th generation (5G) core network (5GC), according to an embodiment of the present disclosure.

Referring to FIG. 1, the 5GC 100 may provide a user with various types of services, including voice, between a 5G radio access network (e.g., next generation-radio access network (RAN) 107) and an external packet data network. A structure, that may be promulgated by one or more mobile communication standards of the Third Generation Partnership Project (3GPP), may define various network functions (NF) in consideration of network function virtualization (NFV) technology and/or software defined networking (SDN) in 5GC, and/or configurations of the 5GC 100 with NFs. Consequently, the 5GC 100 may have functions that may be implemented more flexibly in software, thereby potentially reducing maintenance and repair equipment costs, when compared to an evolved packet core (EPC) of a related 4th generation (4G) communication system. The NFs configuring the 5GC 100 to which the present disclosure may be applied may be exemplified as follows.

As shown in FIG. 1, the 5GC 100 may include an access and mobility management function (AMF) 103, a session management function (SMF) 104, an user plane function (UPF) 108, a policy control function (PCF) 102, and an unified data management function (UDM) 101. Although not shown in FIG. 1, the 5GC 100 may include other NF components such as, but not limited to, an authentication server function (AUSF), an application function (AF), a network exposure function (NEF), a network repository function (NRF), and a network slice selection function (NSSF).

In an embodiment, the AMF 103, the SMF 104, and the UPF 108 may transmit and/or control data by being functionally connected to the RAN 107. For example, the AMF 103 and the SMF 104 may process a control plane, and the UPF 108 may process a user plane. Hereinafter, the SMF 104 and the UPF 108 are described.

The SMF 104 may refer to a NF that may process the control plane. For example, the SMF 104 may allocate an internet protocol (IP) address to a terminal (e.g., user equipment (UE) 109) to provide a connection between the terminal and an external data network. Alternatively or additionally, the SMF 104 may receive an IP address from the UPF 108 and/or the external data network and provide the IP address to the UE 109. The SMF 104 may generate a protocol data unit (PDU) session tunnel by using a general packet radio service (GPRS) tunneling protocol (GTP) on a next-generation user plane (NG-U) interface between a base station of the RAN 107 and the UPF 108. That is, the SMF 104 may perform a function that includes the generating, changing, and/or canceling for the PDU session between the UE 109 and the data network. Alternatively or additionally, the SMF 104 may select the UPF 108 to be used by the UE 109, may set routing of the UPF 108 so that the UPF 108 may deliver packets to the destination, and may transmit and/or receive signaling through the PCF 102 and the interface to receive an operator policy for quality-of-service (QOS) control. Alternatively or additionally, the SMF 104 may provide a control function for charging data collection of the UPF 108, and may support an interface for collecting charging data from the UPF 108 and transmitting charging data to charging servers. Alternatively or additionally, the SMF 104 may determine how to provide continuity of session and service according to the performance of downlink data notification by notification of the UPF 108 that packet data has been received to the downlink and terminal movement, and may also support Lawful Interception for a session management event. Like the AMF 103, the SMF 104 may also utilize the SMF Service by providing Nsmf which is a Service Based Interface (SBI), to other certified NFs (Network Functions), according to the introduction of a service-based structure of the 5G. The SMF 104 may transmit and receive signaling with the AMF 103 through the N11 interface, and may transmit and receive signaling with the UPF 108 through the N4 interface.

In an embodiment, the SMF 104 may be communicatively coupled to a data network (DN) authentication, authorization and accounting (AAA) server (DN-AAA) 105. In such an embodiment, the SMF 104 may access the DN-AAA 105 to provide security requirements and/or to provide secure authentication and authorization methods to the 5GC 100. Alternatively or additionally, as shown in FIG. 1, the DN-AAA 105 may be communicatively coupled to a portal server (data shop) 106.

The UPF 108 may refer to an NF that may process the user plane and/or may filter packets in units of users in order to transmit packets received from the UE 109 to the data network and/or transmit packets received from the data network to the UE 109. In an embodiment, the UPF 108 may serve as a mobility anchor point in a case where the UE 109 moves within the 5G system and/or to another system. The UPF 108 may inform that packets may no longer be received through the corresponding path by transmitting an 'End Marker' to the original base station of the RAN 107. The UPF 108 may allocate a terminal IP address at the request of the SMF 104. The UPF 108 may perform an application traffic detection function by providing a packet inspection function based on a service data flow (SDF) Template and/or a packet flow description (PFD) that may have been provided by the SMF 104. Alternatively or additionally, the UPF 108 may perform traffic gating, redirection, and/or steering according to a policy, and/or may provide a lawful intercept (LI) function through user packet collection. The UPF 108 may also provide transmission rate control for uplink and downlink to provide QoS, packet marking (e.g., differentiated services code point (DSCP)), and/or packet marking for downlink packets to provide reflective QoS. Alternatively or additionally, when the UPF 108 receives a packet to be transmitted to a UE 109 in an idle state, the AMF 103 may operate paging for reception of the UE 109 through the SMF 104. When the UE 109 accesses the network after paging, the UPF 108 may transmit the stored packet to the UE 109. Alternatively or additionally, the UPF 108 may perform a function of collecting charging information under the control of the SMF 104. The UPF 108 may transmit and/or receive signaling with the RAN 107 through the N3 interface, may transmit and/or receive signaling with a data network (DN) 111 and/or a portal data network 110 through the N6 interface, and may transmit and/or receive signaling with the SMF 104 through the N4 interface.

In the above-described 5GC 100, several methods of providing a UPF filter to detect traffic of an application may be implemented.

A first example method may include a method of providing a filter along with a rule (e.g., a packet detection rule (PDR)) related to an operation of detecting application traffic to the UPF 108 when an IP-connectivity access network (IP-CAN) session or a protocol data unit (PDU) session is generated. Each filter may refer to information (e.g., an attribute value-pair (AVP)) such as, but not limited to, a packet filter and a flow description, and the like, that may be used as an application filter. The UPF 108 may perform an operation of detecting traffic of an application based on a provided filter.

A second example method may include a method in which a plurality of filters for applications and an application identifier (ID) indicating the corresponding application are provided to the UPF 108, and only the application ID corresponding to the filter for detecting traffic is subsequently transmitted when an IP-CAN session or an PDU session is generated. The UPF 108 may perform an operation of identifying filters corresponding to the received application ID among a plurality of pre-provided filters and detecting the traffic of the corresponding application based on identified filter. In an embodiment, the filter provided to the UPF 108 may be transmitted through the PFD management request message of the PFD management procedure by being included in the PFD. As used herein, the PFD may be referred to as PFD content, but is not limited thereto, and may be referred to by terms having the same or similar meaning.

The first example method may need a plurality of filters to be transmitted to the UPF 108 along with rules whenever a session is generated or a new service is added. Consequently, the length of the message needed to transmit the plurality of filters may increase and excessive signaling overhead due to frequent message transmission and reception may occur.

Alternatively, according to the second example method, in a case that the SMF 104 and the UPF 108 generate a session or a new service is added, only the application ID may need to be exchanged, and thus, the size of messages transmitted and received between the SMF 104 and the UPF 108 may be reduced. Thereby, an effect of reducing the load of the 5GC network 100 may be obtained. Hereinafter, a method in which the SMF 104 provides a plurality of filters used for detecting the traffic of the application to the UPF 108 based on the above-described second method is described. However, the present disclosure is not limited thereto. For example, the present disclosure may also be applied to the first example method.

In the above-described second method, a series of processes in which the SMF 104 provides the UPF 108 with a plurality of PFDs each including an application ID and a plurality of filters used to detect the traffic of the corresponding application may be referred to as the PFD management. Hereinafter, the PFD management is described.

The SMF 104, according to the present disclosure, may obtain the PFDs from a NEF before providing the plurality of PFDs to the UPF 108 through the PFD management procedure. A process in which the SMF 104 obtains the PFDs from the NEF is described with reference to FIGS. 2A and 2B.

Figure 2A:
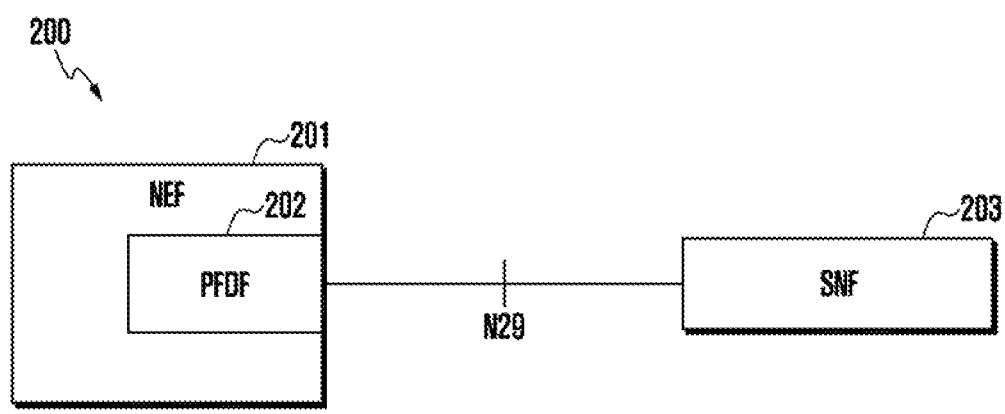
FIG. 2A is a diagram illustrating an interface between a session management function (SMF) and a packet flow detection function (PFDF), according to an embodiment of the present disclosure.

FIG. 2A is a diagram 200 illustrating an interface between an SMF and a packet flow detection function (PFDF), according to an embodiment of the present disclosure.

Referring to FIG. 2A, the SMF 104 and the PFDF 202 may transmit and/or receive signaling through an N29 interface. In the present disclosure, the PFDF 202 may provide the PFDs for at least one application to the SMF 104 at the request of the SMF 104, and the SMF 104 may provide the PFDs to the UPF 108 through the PFD management procedure. Alternatively or additionally, in a case that there is a change in the PFDs associated with a specific application ID, the SMF 104 may subscribe to the PFDF 202 to be able to receive notifications or may unsubscribe the PFDF 202 to receive no more notifications. Hereinafter, a process in which the SMF 104 obtains the PFD for the application from the PFDF 202 is described with reference to FIG. 2B.

Figure 2B:
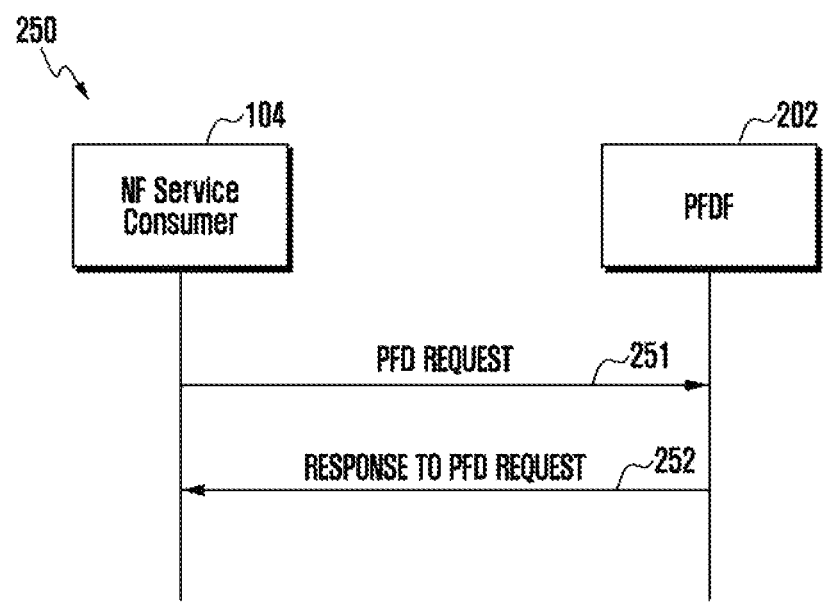
FIG. 2B is a diagram illustrating a process in which an SMF obtains a packet flow description (PFD) from a PFDF, according to an embodiment of the present disclosure.

FIG. 2B is a diagram 250 illustrating a process in which an SMF obtains a PFD from a PFDF according to an embodiment of the present disclosure.

In operation 251, the SMF 104, which may be an NF service consumer, may transmit a message (e.g., GET request) requesting the PFD for at least one application ID.

In operation 252, in case that the PFD request is successful, the SMF 104 may receive a PFD response including a plurality of PFDs for the requested application ID from the PFDF 202. In an embodiment, the PFD response may further include information indicating that the PFD request of operation 251 was successful. Alternatively or additionally, in a case where the PFD request fails, the SMF 104 may receive an error indication (e.g., HTTP state code) indicating that the PFD request of operation 251 has failed from the PFDF 202.

As described with reference to FIG. 2B, the SMF 104 may obtain the PFD for the application and may provide the PFD to the UPF 108 through the PFD management procedure.

In an optional or additional embodiment, an operation in which the SMF 104 obtains the PFD from the PFDF 202 may not be performed. In such an embodiment, a plurality of filters for the application may be pre-configured in the SMF 104, and the SMF 104 may provide a plurality of PFDs, each including a plurality of pre-configured filters, to the UPF 108 through the PFD management procedure. For example, in a case where a filter for uplink is pre-configured in the SMF 104, the SMF 104 may generate (and/or obtain) the PFD including the filter, and provide the PFD to the UPF 108 through the PFD management procedure. As used herein, the operation of generating (and/or obtaining) the PFD may refer to an operation of identifying PFD including a filter according to the format (e.g., a format described with reference to Table 3 or Table 8) of PFD content. Hereinafter, an embodiment in which the SMF 104 provides pre-configured PFDs to the UPF 108 is described.

Figure 3:
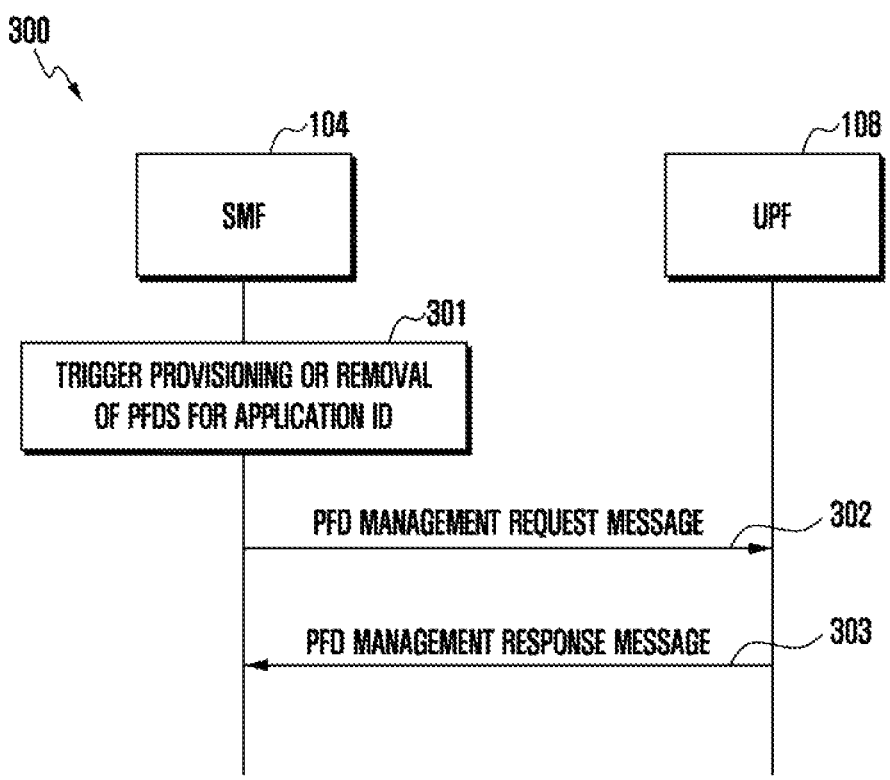
FIG. 3 is a diagram illustrating a PFD management procedure, according to an embodiment of the present disclosure.

By referring to FIG. 3, a method 300 in which the SMF 104 provides the PFD including the filter for detecting application traffic to the UPF 108 through the PFD management procedure is described.

FIG. 3 is a diagram illustrating a PFD management procedure, according to an embodiment of the present disclosure.

The PFD management procedure may refer to a procedure in which an SMF 104, which is a control plane, provides PFDs including a plurality of filters pre-configured for at least one application ID to the UPF 108, which is a user plane, and/or requests the UPF 108 to remove them.

In operation 301, the SMF 104 may determine whether to provision the PFDs for the at least one application to the UPF 108, and/or trigger (e.g., initiate) the PFD management procedure so that the UPF 108 may remove the PFDs for the at least one application. For example, in a case where the SMF 104 receives new PFDs from the PFDF 202 and/or the SMF 104 determines that the PFD previously provided to the UPF 108 is no longer a valid PFD, the SMF 104 may trigger the PFD management procedure.

In operation 302, in a case where the SMF 104 triggers the PFD management procedure, the SMF 104 may transmit the PFD management request message to the UPF 108. Here, the PFD management request message may be configured with the application ID and the PFDs including the plurality of filters for an application corresponding to the application ID. Alternatively or additionally, in a case where the SMF 104 has determined that the PFD previously provided to the UPF 108 is no longer the valid PFD, the SMF 104 may empty information on the application ID or the PFDs in the PFD management request message, and transmit the PFD management request message. In an embodiment, in a case where the information on the application ID or the PFDs is not present in the PFD management request message, the UPF 108 that received the PFD management request message from the SMF 104 may delete all PFDs for all applications provided through the previous PFD management procedure. Alternatively or additionally, in a case where the information on at least one PFD exists in the PFD management request message, the UPF 108 may delete all PFDs previously provided for the corresponding application and may store all PFDs received in the PFD request message.

In operation 303, in a case where the UPF 108 successfully performs an operation according to the above-described PFD management request message, the UPF 108 may transmit a PFD management response message including information (e.g., cause "success") indicating that the PFD management is successful to the SMF 104.

As described with reference to FIG. 3, the PFD management request message may be transmitted to the UPF 108 for each application. That is, one PFD management request message may be transmitted for each application ID. For example, the PFD management request message of the present disclosure may include information in a format as shown in Table 1 below.

TABLE 1

| PFD Management Request Message | |
| --- | --- |
| Octets 1 and 2 | Application ID's PFDs IE Type = 58 (decimal) |
| Octets 3 and 4 | Length = n |

| Information elements | P | Condition/Comment | Appl. S xa | S xb | S xc | N4 | IE Type |
| --- | --- | --- | --- | --- | --- | --- | --- |
| Application ID | M | This IE may identify the application ID for which PFDs may be provisioned in the UPF function. | — | X | X | X | Application ID |
| PFD context | C | This IE may be present if the PFD needs to be provisioned in the UPF function. When present, this IE may describe the PFD to be provisioned in the UPF function. Several IEs with the same IE type may be present to provision multiple PFDs for this application ID. When this IE is absent, the UPF function may delete all the PFDs received and stored earlier in the UPF function for this application ID. | — | X | X | X | PFD context |

According to Table 1, the PFD management request message may include the application ID and PFD context associated with PFDs to be provided to the UPF 108. As used herein, the PFD context may refer to a plurality of PFDs (e.g., a PFD set) for an application corresponding to the application ID. In an embodiment, the PFD context may not be included, and as a result, the UPF 108 may delete all PFDs for the corresponding application ID provided through the previous PFD management procedure. That is, in a case where only the application ID is included and the PFD context of the PFDs for the application ID is not included, the UPF 108 may delete all PFDs previously provided for the corresponding application ID.

According to an embodiment, the PFD context of Table 1 may include the PFD content as shown in Table 2 below, wherein the PFD content may refer to information that may be included in one PFD. Alternatively or additionally, providing the PFD may refer to providing the PFD content, and information (and/or properties) of the PFD content that may be used to detect traffic of the corresponding application. For example, the UPF 108 may perform a traffic detection operation based on whether information of the PFD content and traffic of an application match. That is, the UPF 108 may identify whether the incoming traffic is detected based on whether the incoming traffic matches all properties, at least one property, or any one property of the PFD content. The information of the PFD content may have, for example, a format as shown in Table 3 below.

TABLE 2

PFD Context

| Octets 1 and 2 | PFD context IE Type = 59 (decimal) | | | | | |
| Octets 3 and 4 | Length = n | | | | | |
| | | | | Appl. | | |
| Information elements | P | Condition/Comment | S xa | S xb | S xc | N4 | IE Type |
| PFD context | M | This IE may describe the PFD to be provisioned in the UPF function. Several IEs with the same IE type may be present to provision multiple content for this PFD). (NOTE 1) | — | X | X | X | PFD context |

(NOTE 1)
The CP function (e.g., the SMF 104 of FIG. 1) may provision a PFD content including a property with multiple values if the UPF 108 supports PFDE function.

TABLE 3

PFD Content

| | Bits | | | | | | | |
|---|---|---|---|---|---|---|---|---|
| Octets | 8 | 7 | 6 | 5 | 4 | 3 | 2 | 1 |
| 1 to 2 | Type = 61 (decimal) | | | | | | | |
| 3 to 4 | Length = n | | | | | | | |
| 5 | ADNP | AURL | AFD | DNP | CP | DN | URL | FD |
| 6 | Spare | | | | | | | |
| m to (m + 1) | Length of Flow Description | | | | | | | |
| (m + 2) to p | Flow Description | | | | | | | |
| q to (q + 1) | Length of URL | | | | | | | |
| (q + 2) to r | URL | | | | | | | |
| s to (s + 1) | Length of Domain Name | | | | | | | |
| (s + 2) to t | Domain Name | | | | | | | |
| u to (u + 1) | Length of Custom PFD Content | | | | | | | |
| (u + 2) to v | Custom PFD Content | | | | | | | |
| w to (w + 1) | Length of Domain Name Protocol | | | | | | | |
| (w + 2) to x | Domain Name Protocol | | | | | | | |
| y to (y + 1) | Length of Additional Flow Description | | | | | | | |
| (y + 2) to z | Additional Flow Description | | | | | | | |
| a to (a + 1) | Length of Additional URL | | | | | | | |
| (a + 2) to b | Additional URL | | | | | | | |
| c to (c + 1) | Length of Additional Domain Name and Domain Name Protocol | | | | | | | |
| (c + 2) to d | Additional Domain Name and Domain Name Protocol | | | | | | | |
| e to (n + 4) | These octets may be present only if explicitly specified | | | | | | | |

As shown in Table 3, the octet 5 of the PFD content may include flags indicating the type of the PFD content.

For example, each flag of the octet 5 may indicate the following information.

Bit 1—Flow Description (FD): If the FD bit is set to "1", the FD bit may indicate that the length of flow description field and the flow description field in Table 4 are present in the PFD content. Alternatively or additionally, the FD bit may indicate that the PFD content is of the flow description type. That is, the FD bit being set to "1" may indicate that the flow description (e.g., filter) is included in the PFD. Alternatively or additionally, if FD bit is set to "0", the FD bit may indicate that the length of flow description field and the flow description field are not present. That is, when the FD bit is set to "0", the FD bit may indicate that the flow description (e.g., filter) is not included in the PFD.

Bit 2—Uniform Resource Locator (URL): If the URL bit is set to "1", the URL bit may indicate that the length of URL field and the URL field of Table 4 are present in the PFD content. That is, the URL bit being set to "1" may indicate that the PFD content is of the URL type. Alternatively or additionally, if the URL bit set to "0", the URL bit may indicate that the length of URL field and the URL field are not present in the PFD content.

Bit 3—Domain Name (DN): If the DN bit is set to "1", the DN bit may indicate that the length of domain name field and the domain name field of Table 4 are present in the PFD content. That is, the DN bit being set to "1" may indicate that the PFD content is of the domain name type. Alternatively or additionally, if the DN bit set to "0", the DN bit may indicate that the length of domain name field and the domain name field are not present in the PFD content.

Bit 4—Custom PFD Content (CP): If the CP bit is set to "1", the CP bit may indicate that the length of custom content field and the custom PFD content field of Table 4 are present in the PFD content. That is, the CP bit being set to "1" may indicate that the PFD content is of the custom PFD content type. Alternatively or additionally, if the CP bit set to "0", the CP bit may indicate that the length of custom content field and the custom PFD content field are not present in the PFD content.

Bit 5—Domain Name Protocol (DNP): If the DNP bit is set to "1", the DNP bit may indicate that the length of domain name protocol field and the domain name protocol field of Table 4 are present in the PFD content. That is, the DNP bit being set to "1" may indicate that the PFD content is of the domain name protocol type. Alternatively or additionally, if the DNP bit set to "0", the DNP bit may indicate that the length of domain name protocol field and the domain name protocol field are not present in the PFD content.

Bit 6—Additional Flow Description (AFD): If the AFD bit is set to "1", the AFD bit may indicate that the length of additional flow description field and the additional flow description field of Table 4 are present in the PFD content. That is, the AFD bit being set to "1" may indicate that the PFD content is of the additional flow description type. Alternatively or additionally, if the AFD bit is set to "0", the AFD bit may indicate that the length of additional flow description field and the additional flow description field are not present in the PFD content.

Bit 7—Additional URL (AURL): If the AURL bit is set to "1", the AURL bit may indicate that the length of additional URL field and the additional URL field of Table 4 are present in the PFD content. That is, the AURL bit being set to "1" may indicate that the PFD content is of the additional URL type. Alternatively or additionally, if the AURL bit is set to "0", the AURL bit may indicate that the length of additional URL field and the additional URL field are not present in the PFD content.

Bit 8—Additional Domain Name and Domain Name Protocol (ADNP): If the ADNP bit is set to "1", the ADNP bit may indicate that the length of additional domain name and domain name protocol field and the additional domain name and domain name protocol field of Table 4 are present in the PFD content. That is, the ADNP bit being set to "1" may indicate that the PFD content is of the additional domain name and domain name protocol type. Alternatively or additionally, if the ADNP bit is set to "0", the ADNP bit may indicate that the length of additional domain name and domain name protocol field and the additional domain name and domain name protocol field are not present in the PFD content.

That is, whether to support the above-described PFD management procedure may correspond to an option of the SMF 104 and the UPF 108. Thus, in a case where the UPF 108 may support the PFD management procedure, the UPF 108 may inform the SMF 104 that the UPF 108 may support the PFD management procedure. For example, the UPF 108 may inform the SMF 104 that the UPF 108 may support the PFD management procedure by performing an N4 association setup procedure between the SMF 104 and the UPF 108, as described with reference to FIG. 4.

Figure 4:
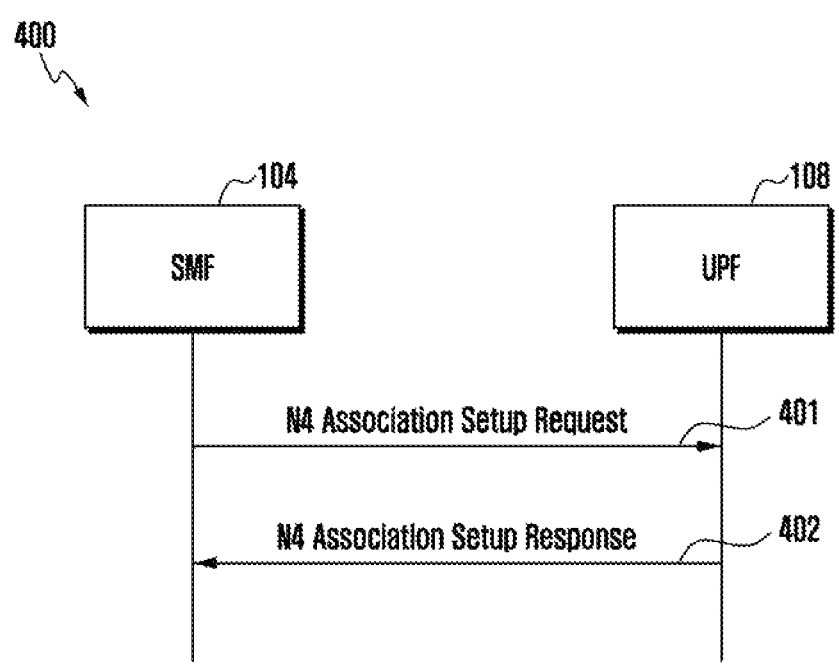
FIG. 4 is a diagram illustrating an association procedure between an SMF and a user plane function (UPF), according to an embodiment of the present disclosure.

FIG. 4 is a diagram illustrating an association procedure between an SMF and a UPF according to an embodiment of the present disclosure.

The N4 association setup procedure 400 performed between the SMF 104 and the UPF 108 may refer to a series of procedures performed to enable the SMF 104 to establish an N4 session using the UPF 108 resources by generating an N4 association between the SMF 104 and the UPF 108.

Referring to FIG. 4, in operation 401, the SMF 104 may transmit an N4 association setup request (or may be referred to using various terms such as, but not limited to, an N4 association setup request message, an association setup request, an association setup request message, and the like) to the UPF 108.

In operation 402, in response to the N4 association setup request transmitted in operation 401, the SMF 104 may receive an N4 association setup response (or may be referred to using various terms such as an N4 association setup response message, an association setup response, an association setup response message, and the like) from the UPF 108. In an embodiment, the N4 association setup response message may include information on features supported by the UPF 108. For example, the N4 association setup response message may follow a format as shown in Table 4 below.

TABLE 4

N4 Association Setup Response Message

| Octets | Bits |
|---|---|
| | 8  7  6  5  4  3  2  1 |
| 1 to 2 | Type = 43 (decimal) |
| 3 to 4 | Length = n |
| 5 to 6 | Supported-Features |
| 7 to 8 | Additional Supported-Features 1 |
| 9 to 10 | Additional Supported-Features 2 |
| 11 to (n + 4) | These octets may be present only if explicitly specified |

In Table 4, the function supported by the UPF 108 may be indicated based on the bits set in the supported-features field corresponding to octets 5 to 6, the additional supported-features 1 field corresponding to octets 7 to 8, and the additional supported-features 2 field corresponding to octets 9 to 10. For example, by setting six (6) bits of the supported-features field corresponding to octet 5 to "1", the supported-features field may indicate that the UPF 108 supports a function (e.g., a PFD management (PFDM) feature) capable of performing a PFD management procedure. As shown in FIG. 4, the SMF 104 may initiate the N4 association setup procedure as an example, but the present disclosure is not limited thereto. That is, the UPF 108 may initiate the N4 association setup procedure. In such an embodiment, the UPF 108 may include information on features supported by the UPF 108, in the N4 association setup request message, and may transmit the N4 association setup request message to the SMF 104.

In an embodiment, the PFD management request message and/or the PFD management response message may be transmitted and/or received through an N4 interface using a packet forwarding control protocol (PFCP) based on a user datagram protocol (UDP). Assuming that a maximum length of a UDP payload is 65,535 bytes, which may correspond to the maximum value of a length field having 16 bits, there is may be restriction that the payload of the PFD management request message transmitted through the N4 interface using the PFCP based on UDP needs to be within about 60,000 bytes. For example, in a case where a network operator sets hundreds or more filters for one application and wants to provide PFDs, in which each PFD includes the filters, to the UPF 108, the payload length of the PFD management request message including the PFDs may need to be less than the maximum length of the UDP payload. That is, in a case where the network operator wants to provide the UPF 108 with the PFD (e.g., an IPv6 flow description type PFD) that includes a filter that includes both the source and destination of the packet, as shown in Table 5 below, the number of PFDs for one application that may be included in the PFD management request message may be limited to about 400.

TABLE 5

Example PFD

"permit out 17 from 2132:5678:9abc:def0:2132:5678:9abc:def0 65530-65534 to 3132:5678:9abc:def0:3132:5678:9abc:def0 65530-65534"

In an optional or additional embodiment, two single-directional PFDs, each including a filter for an Uplink direction and a filter for a Downlink direction, may be provided to the UPF 108 together. For example, as shown in Table 6, the PFD including the filter for the Uplink and the PFD including the filter for the Downlink may be included in the PFD management request messages respectively and may be provided to the UPF 108.

TABLE 6

Example PFD

Uplink: "permit in 17 from any to 10.1.1.10 8080"
Downlink: "permit out 17 from 10.1.1.10 8080 to any"

In an embodiment, the filters of Table 6 may be different only in the direction, but other information, such as, but not limited to, IP Protocol, Source/Destination IP Address, Source/Destination Port Number, and the like, may be the same. Thus, in such an embodiment, providing both the filter for the Uplink and the filter for the Downlink to the UPF 108 may include providing redundant information, and thereby, the length resource of limited messages may be used inefficiently.

That is, if a filter for one direction is provided to the UPF 108, the UPF 108 may derive a filter for the other direction based on the filter provided. Consequently, the number of PFDs that may be included in the PFD management request may be reduced, and thereby, the above-described message length limitation may be addressed. Alternatively or additionally, an improved application traffic detection may be performed by enabling an increased quantity and/or diversity of filters to be set for the corresponding application. A method by which the UPF 108 may receive only the PFD including a filter for any one direction and may derive a filter for the other direction is described. In the present disclosure, the bidirectional filter may be referred to by a bidirectional flow description and/or a term having the same and/or similar meaning, and may refer to a filter included in the PFD according to a format as shown in Table 8.

In an embodiment, instead of providing the UPF 108 with both single-directional PFDs including the filter for Uplink and the filter for Downlink, respectively, the SMF 104 may provide the UPF 108 with the PFD including the filter for any one direction and information (e.g., a specific indicator) indicating that the filter may be applied in both directions. Based on the UPF 108 provided with the PFD and the filter for any one direction included in the PFD, a filter in the opposite direction may be identified (and/or derived) and may be used in the traffic detection operation of the application. In an optional or additional embodiment, the UPF 108 may perform an operation of identifying (and/or deriving) the filter of the opposite direction based on the filter for any one direction included in the PFD, which may be referred to as a bidirectional (BIDIR) function.

In an embodiment, the operation the SMF 104 of the control plane and the UPF 108 of the user plane may need to be changed in order to perform the BIDIR function. That is, support of the BIDIR function by the UPF 108 may be optional. Thus, the UPF 108, according to an embodiment, may notify the SMF 104 whether the UPF 108 supports the BIDIR function. For example, the UPF 108 may notify the SMF 104 in a N4 association setup procedure between the SMF 104 and the UPF 108 (e.g., as described with reference to FIG. 4), the UPF 108 may include information on functions supported by the UPF 108 in the N4 association setup request message (e.g., in a case where the N4 association setup procedure is initiated by the UPF 108) and/or the N4 association setup response message (e.g., in a case where the N4 association setup procedure is initiated by the SMF 104), which may be transmitted to the SMF 104. For another example, the UPF 108 may notify the SMF 104 by including information on functions supported by the UPF 108 in the N4 association setup request message and/or the N4 association setup response message according to a format as shown in Table 7 below. In an embodiment, the format shown in Table 7 may be a vendor-specific information element format that may be defined by agreement between vendors

TABLE 7

N4 Association Message Format

| Octets | Bits | | | | | | | |
|---|---|---|---|---|---|---|---|---|
| | 8 | 7 | 6 | 5 | 4 | 3 | 2 | 1 |
| 1 to 2 | Type = xxx (decimal) | | | | | | | |
| 3 to 4 | Length = n | | | | | | | |
| 5 to 6 | Enterprise ID | | | | | | | |
| 7 to (n + 4) | IE specific data or content of a grouped IE | | | | | | | |

| Feature Octet/Bit | Feature | Interface | Description |
|---|---|---|---|
| 7/1 | BIDIR | N4 | Bidirectional Filter is supported by the UP function |

According to Table 7, in a case where bit 1 of the field corresponding to octet 7 is set to "1", the field may indicate that the UPF 108 supports the BIDIR function.

The SMF 104 may identify whether a filter to be provided to the UPF 108 that may be applied in bi-directions. Alternatively or additionally, when the filter may be applied in bi-directions, the SMF 104 may identify that the UPF 108 supports the BIDIR function. In a case where the UPF 108 supports the BIDIR function, the SMF 104 may provide the UPF 108 with the PFD including the filter and an indicator that the filter may be applied in bi-directions. Alternatively or additionally, in a case where the PFD including a filter to which the SMF 104 may be applied in bi-directions is provided to the UPF 108, information (e.g., PFD content) that may be included in the PFD may follow a format as shown in Table 8 below.

TABLE 8

PFD Content Format

| Octets | Bits | | | | | | | |
|---|---|---|---|---|---|---|---|---|
| | 8 | 7 | 6 | 5 | 4 | 3 | 2 | 1 |
| 1 to 2 | Type = 61 (decimal) | | | | | | | |
| 3 to 4 | Length = n | | | | | | | |
| 5 | ADNP | AURL | AFD | DNP | CP(1) | DN | URL | FD |
| 6 | Spare | | | | | | | |
| 7 to 8 | Length of Custom PFD Content | | | | | | | |
| 9 | CustomPfdType = BIDIR | | | | | | | |
| 10 to n | Bidirectional Flow Description | | | | | | | |

According to Table 8, the bit 4 of octet 5 being set to "1" may indicate that a custom PFD content field exists, that a type indicating that the filter included in the corresponding PFD is a filter that may be applied in this bi-directions is designated in the field of Octet 9 where the PFD content begins. In such an example, the PFD content may provide the UPF 108 with the PFD including a filter for any one direction (e.g., uplink and/or downlink) in a subsequent field (e.g., octets 10 to n). The UPF 108 may identify whether the filter included in the received PFD may be applied in bi-directions based on information included in the corresponding PFD (e.g., information on the type of the PFD or an indicator), and according to the information, the UPF 108 may perform an application traffic detection operation. Hereinafter, the operation of the SMF 104 and the UPF 108 operated according to a method for providing the PFD providing is described with reference to FIGS. 5 to 9.

Figure 5:
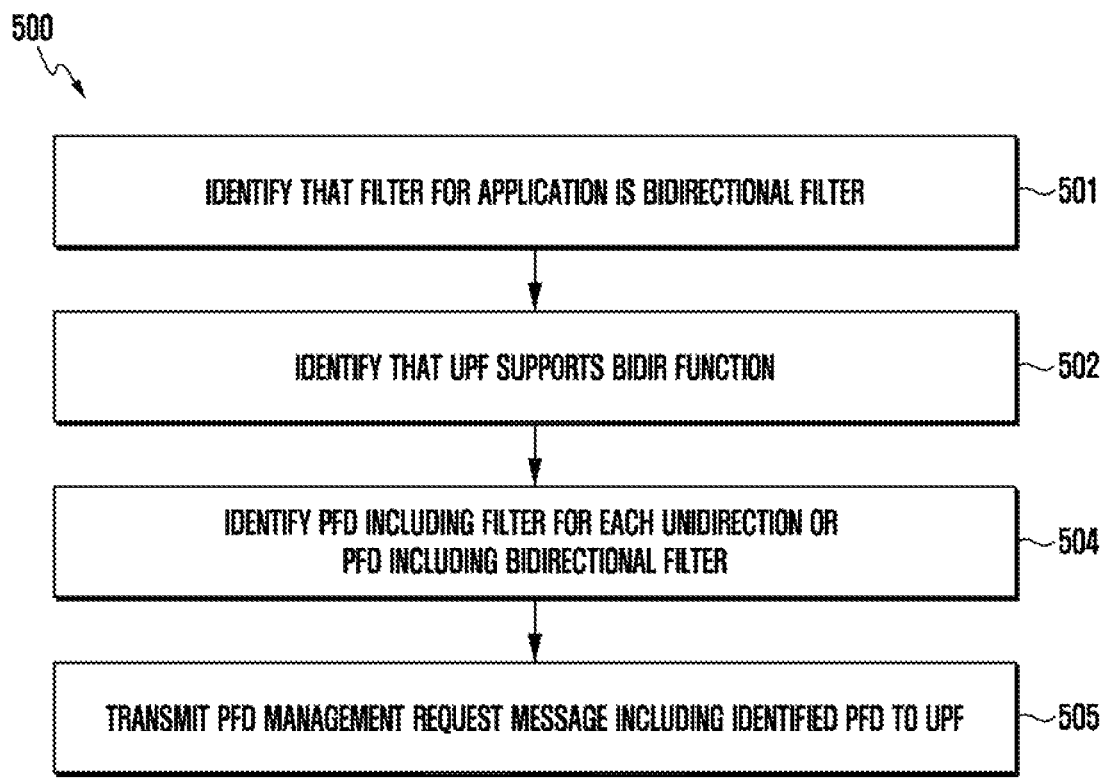
FIG. 5 is a diagram illustrating an operation of an SMF, according to an embodiment of the present disclosure.

FIG. 5 is a diagram illustrating a method 500 of an SMF, according to an embodiment of the present disclosure.

Referring to FIG. 5, in operation 501, the SMF 104 may identify whether the filter for the application is for an Uplink direction, a Downlink direction, and/or bi-directions. Alternatively or additionally, the SMF 104 may identify whether the filter may be applied in bi-directions (whether the filter is a bidirectional filter). For example, in a case where the filter is pre-configured for bi-directions, or in a case where the filter for the Uplink direction and the filter for the Downlink direction have opposite sources and destinations, and other information (e.g., IP Protocol, IP address, port) is the same, the SMF 104 may identify that the filter (and/or the filter for the Downlink direction) for the Uplink direction may be applied in bi-directions. That is, the filter may be applied in bi-directions when the same filter as the filter for the opposite direction may be obtained as a result of switching only source and destination information among the information of the corresponding filter. For example, in a case where the filter for the Uplink direction (hereinafter referred to as a first filter) and the filter for the Downlink direction (hereinafter referred to as a second filter) are included in the PFD, and as a result of switching only the source and destination information among the information of the first filter, the same filter as the second filter is obtained (and/or generated), the SMF 104 may identify that the first filter may be applied in bi-directions. Alternatively or additionally, in a case where a filter different from the second filter is obtained as a result of switching only the source and destination information among the information of the first filter, the SMF 104 may identify that the first filter cannot be applied in bi-directions. Alternatively or additionally, identifying whether the filter may be applied in bi-directions in the present disclosure may refer to identifying whether the corresponding filter is a bidirectional filter.

In operation 502, in a case where the SMF 104 has identified that the filter may be applied in bi-directions, the SMF 104 may identify whether the UPF 108 supports the BIDIR function capable of deriving the filter for another direction from the filter for any one direction. For example, the SMF 104 may identify whether the UPF 108 supports the BIDIR function based on information on the functions supported by the UPF 108 received in the N4 association setup procedure with the UPF 108, as described with reference to FIG. 4.

In operation 504, if in a case where the UPF 108 does not support the BIDIR function, the SMF 104 may identify (and/or generate, obtain) two PFDs each including the filter for the Uplink direction and the filter for the Downlink direction. Here, the PFD may follow the format shown in Table 3. Alternatively or additionally, if in a case where the UPF 108 supports the BIDIR function, the SMF 104 may identify (and/or generate, obtain) the PFD including the filter for any one direction and information (e.g., type information, indicator) that the filter may be applied in bi-directions. Here, the PFD may follow the format shown in Table 8.

In operation 505, the SMF 104 may transmit the PFD identified in operation 504 to the UPF 108 by including the PFD in the management request message.

In some embodiments, operations 501 to 505 of FIG. 5 may be performed simultaneously, and/or some of the operations may be omitted.

Figure 6:
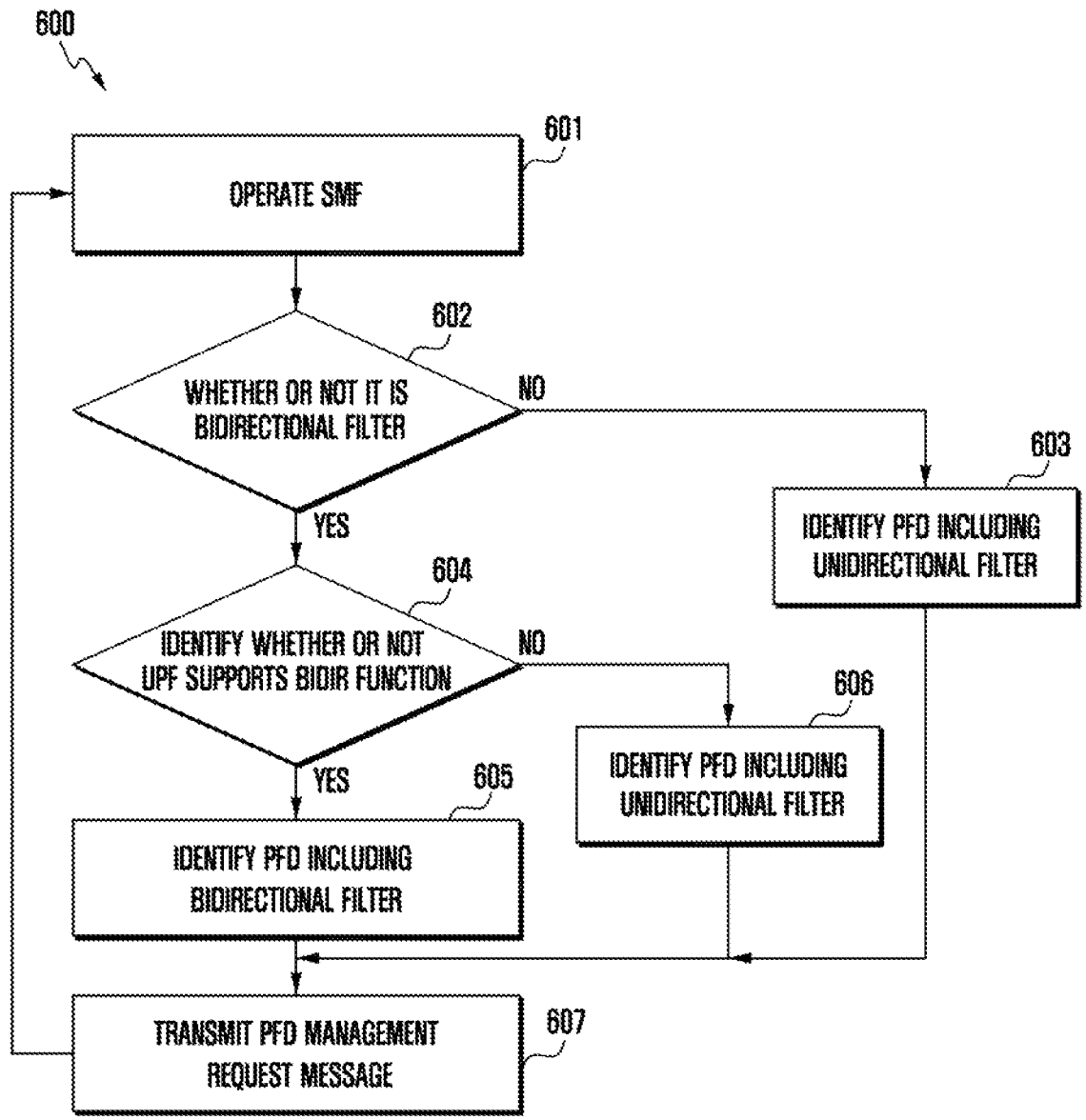
FIG. 6 is a diagram illustrating a process in which an SMF provides a PFD including a filter for detecting traffic of an application to a UPF, according to an embodiment of the present disclosure.

FIG. 6 is a diagram illustrating a process 600 in which an SMF 104, according to an embodiment of the present disclosure, may provide a PFD including a filter for detecting traffic of an application to a UPF 108.

Referring to FIG. 6, in operation 601, the SMF 104 may operate by processing the control plane of a 5GC (e.g., 5GC 100 of FIG. 1).

In operation 602, the SMF 104 may identify whether a filter for the application is for an Uplink direction, a Downlink direction, or bi-directions, and/or may identify whether the filter may be applied in bi-directions. For example, in a case where the filter is pre-configured for bi-directions, or in a case where the filter for the Uplink direction and the filter for the Downlink direction have opposite sources and destinations, and other information (e.g., IP Protocol, IP address, Port) is the same, the SMF 104 may identify that the filter for the Uplink direction (and/or the filter for the Downlink direction) may be applied in bi-directions. In a case where the SMF 104 identifies that the filter cannot be applied in bi-directions in operation 602 (NO in operation 602), in operation 603, the SMF 104 may identify (and/or generate, obtain) two PFDs each including the filter for the Uplink direction and the filter for the Downlink direction. Here, the PFD may follow the format shown in Table 3.

Alternatively or additionally, in a case where the SMF 104 identifies that the filter may be applied in bi-directions in operation 602 (YES in operation 602), in operation 604, the SMF 104 may identify whether the UPF 108 supports the BIDIR function capable of deriving the filter for another direction from the filter for any one direction. For example, the SMF 104 may identify whether the UPF 108 supports the BIDIR function based on information on the functions supported by the UPF 108 received in the N4 association setup procedure with the UPF 108.

In a case where the SMF 104 identifies that the UPF 108 supports the BIDIR function in operation 604 (YES in operation 604), in operation 605, the SMF 104 may identify (and/or generate, obtain) the PFD including the filter for any one direction and information (e.g., type information, indicator) that may be applied in bi-directions. Here, the PFD may follow the format shown in Table 8.

In a case where the SMF 104 identifies that the UPF 108 does not support the BIDIR function in operation 604, in operation 606, the SMF 104 may identify (and/or generate, obtain) two PFDs each including the filter for the Uplink direction and the filter for the Downlink direction. Here, the PFD may follow the format shown in Table 3.

In operation 607, the SMF 104 may transmit the PFD to the UPF 108 by including the PFD identified in the operation 603, the operation 605, or the operation 606 in the PFD management request message.

In an embodiment, operations 602 to 607 of FIG. 6 may be performed simultaneously, and/or some operations may be omitted.

Figure 7:
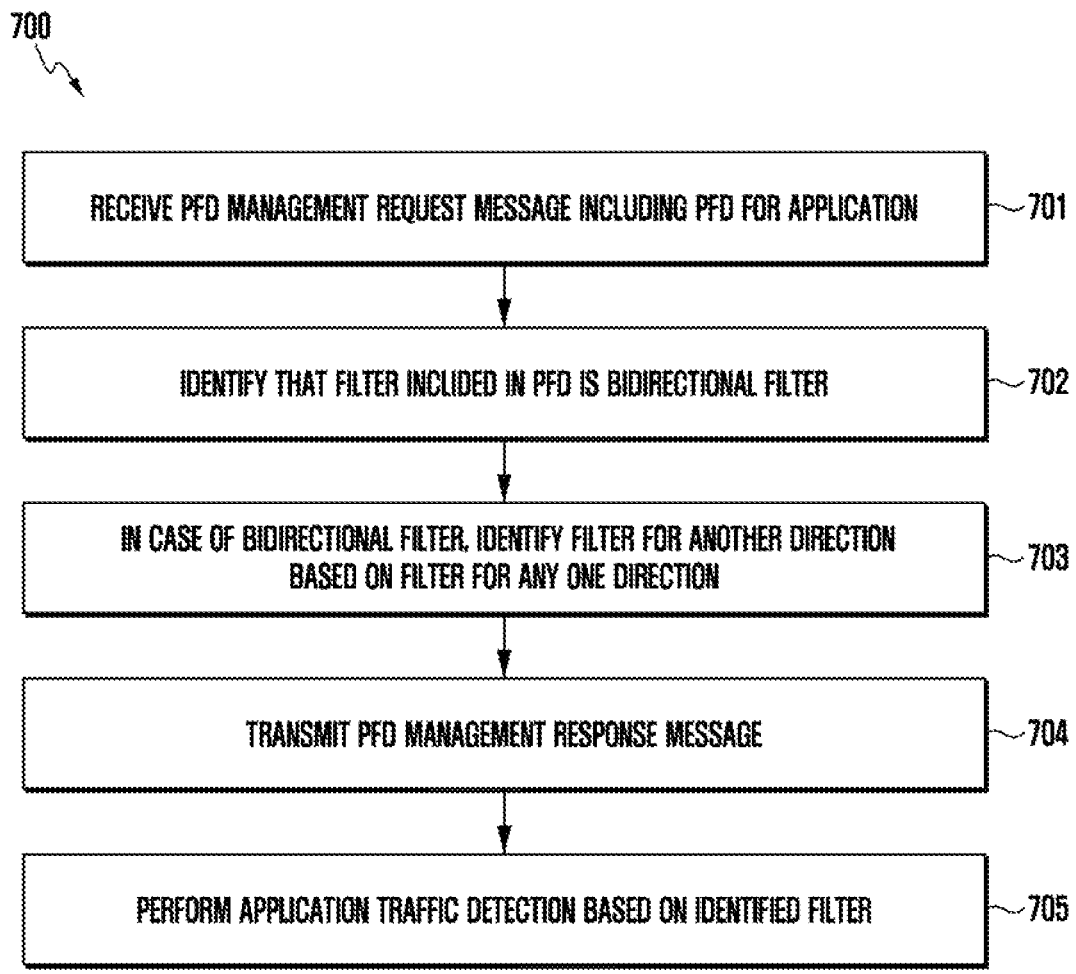
FIG. 7 is a diagram illustrating an operation of a UPF, according to an embodiment of the present disclosure.

FIG. 7 is a diagram illustrating an operation 700 of a UPF 108, according to an embodiment of the present disclosure.

Referring to FIG. 7, in operation 701, the UPF 108 may receive a PFD management request message including a plurality of PFDs for an application from the SMF 104.

In operation 702, the UPF 108 may identify whether the filter may be applied in bi-directions based on information (e.g., type information, indicator) included in the received PFD. For example, in a case where the received PFD includes the filter according to the format shown in Table 3, the UPF 108 may identify that the filter is a filter for single-direction that cannot be applied in bi-directions. Alternatively or additionally, in a case where the received PFD includes the filter according to the format shown in Table 8, the UPF 108 may identify that the filter may be applied in bi-directions.

In a case where the UPF 108 identifies that the received filter may be applied in bi-directions in operation 701, in operation 703, the UPF 108 may derive (and/or obtain, generate) the filter for another (e.g., opposite) direction from the filter for any one direction, and may apply the two filters as filters for detecting traffic of the application. For example, in a case where the UPF 108 identifies that the received filter is a filter for an Uplink direction and may be applied in bi-directions, the UPF 108 may derive a filter for a Downlink direction from the filter, and may apply the received filter and the derived filter as a filter for detecting traffic of the application. In an embodiment, an operation of deriving the filter for another direction from the filter for any one direction may refer to an operation of identifying a filter in a direction different from the corresponding filter by switching the source and destination of the filter.

In operation 704, the UPF 108 may transmit a PFD management response message including information indicating that the PFD management has succeeded to the SMF 104, in response to the PFD management request message received in operation 701.

In operation 705, the UPF 108 may perform an operation of detecting traffic of the application based on the identified filters. For example, the UPF 108 may identify whether traffic of an application matching the identified filter has been generated (e.g., detected, received).

In an embodiment, operations 701 to 705 of FIG. 7 may be performed simultaneously, and/or some operations may be omitted.

Figure 8:
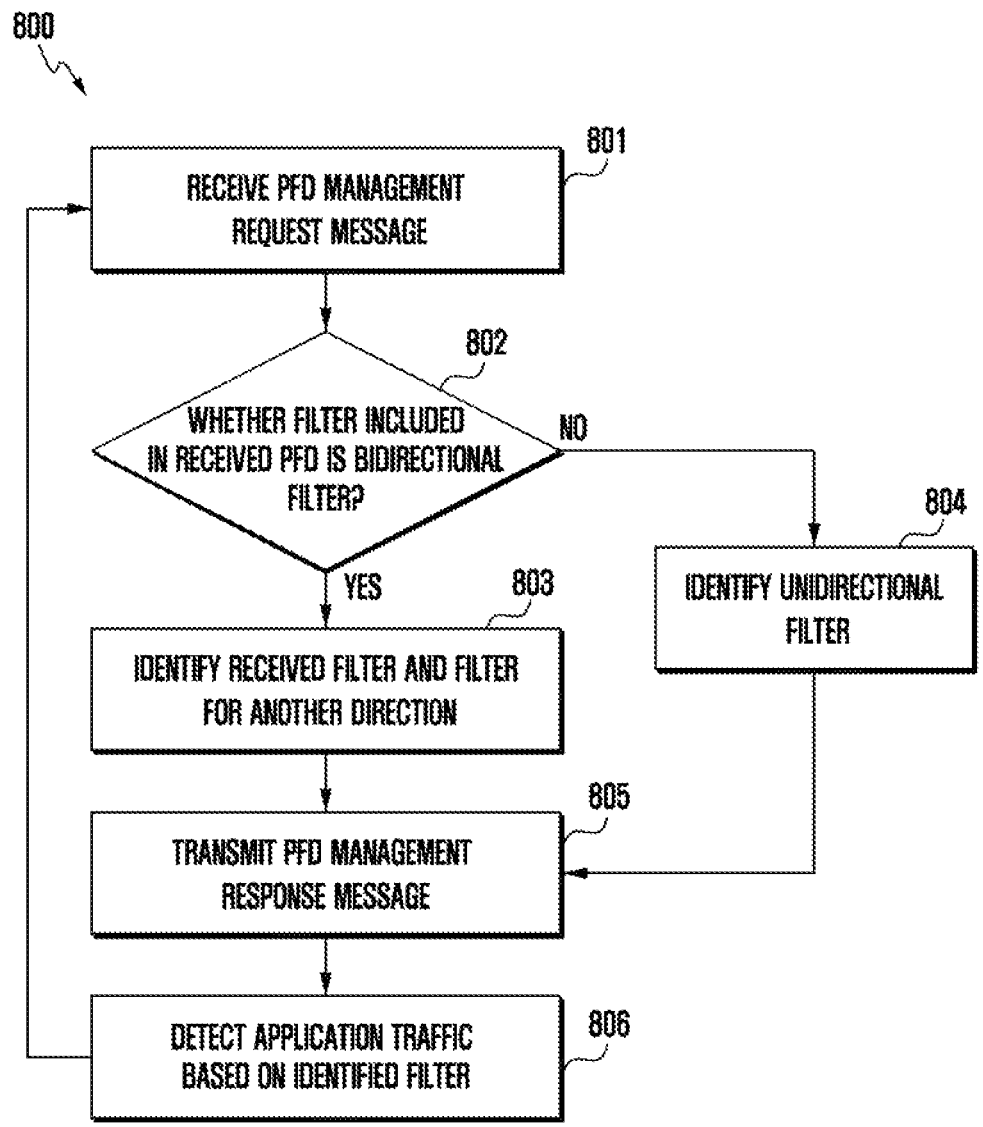
FIG. 8 is a diagram illustrating a process in which a UPF receives a PFD including a filter for detecting traffic of an application from SMF and performs an application traffic detection operation based on the filter, according to an embodiment of the present disclosure.

FIG. 8 is a diagram 800 illustrating a process in which a UPF 108, according to an embodiment, receives a PFD including a filter for detecting traffic of an application from SMF 104 and performs an application traffic detection operation based on the filter.

Referring to FIG. 8, in operation 801, the UPF 108 may receive a PFD management request message including a plurality of PFDs for the application from the SMF 104.

In operation 802, the UPF 108 may identify whether the filter may be applied in bi-directions based on information (e.g., type information, indicator) included in the received PFD. For example, in a case where the received PFD includes the filter according to the format shown in Table 3, the UPF 108 may identify that the filter is a filter for single-direction that cannot be applied in bi-directions. Alternatively or additionally, in a case where the received PFD includes the filter according to the format shown in Table 8, the UPF 108 may identify that the filter may be applied in bi-directions.

In a case where the UPF 108 identifies that the filter received in operation 801 may only be applied in single-direction (e.g., Uplink direction and/or Downlink direction) or in a case where the UPF 108 does not support the BIDIR function (NO in operation 802), in operation 804, the UPF 108 may apply a single-directional filter as a filter for detecting traffic of the application.

In a case where the UPF 108 identifies that the filter received in operation 801 may be applied in bi-directions (YES in operation 802), in operation 803, the UPF 108 may derive the filter for another direction from the filter for any one direction, and may apply the two filters as filters for detecting traffic of the application. For example, in a case where the UPF 108 identifies that the received filter is a filter for the Uplink direction and may be applied in bi-directions, the UPF 108 may derive a filter for the Downlink direction from the Uplink filter, and may apply the received filter and the derived filter as the filter for detecting traffic of the application. In an embodiment, an operation of deriving the filter for another direction from the filter for any one direction may refer to an operation of identifying a filter in a direction different from the corresponding filter by switching the source and destination of the filter.

In operation 805, the UPF 108 may transmit a PFD management response message including information indicating that the PFD management has succeeded to the SMF 104 in response to the PFD management request message received in operation 801.

In operation 806, the UPF 108 may perform an operation of detecting traffic of the application based on the filter identified in operation 803 or in operation 804. For example, the UPF 108 may identify whether traffic of the application matching the identified filter has been generated. In an embodiment, operations 801 to 806 of FIG. 8 may be performed simultaneously, and/or some of the operations may be omitted.

Figure 9:
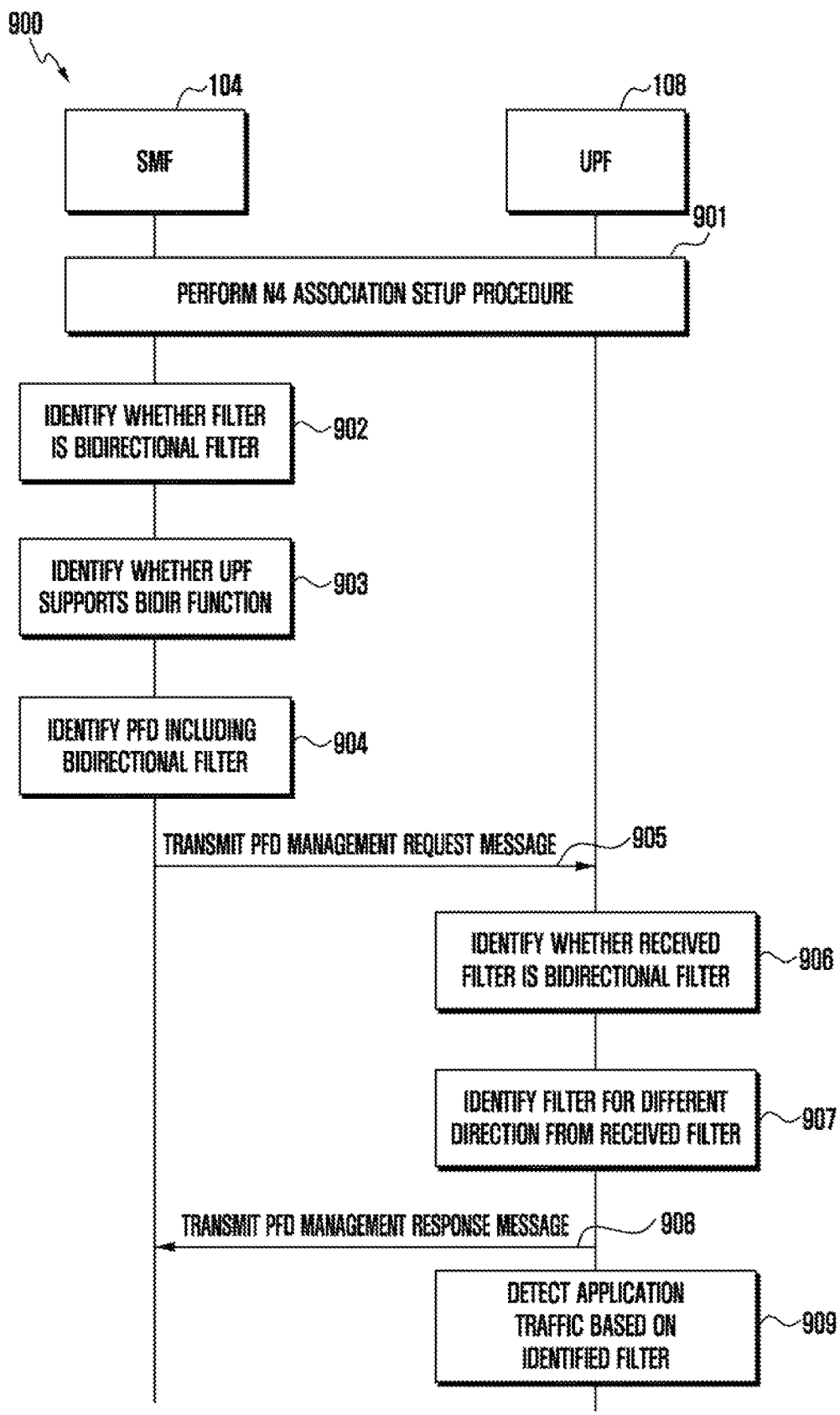
FIG. 9 is a diagram illustrating an overall flow of a PFD management procedure in which an SMF provides a PFD including a bidirectional filter to a UPF, according to an embodiment of the present disclosure.

FIG. 9 is a diagram 900 illustrating an overall flow of a PFD management procedure in which an SMF 104 provides a PFD including a bidirectional filter to a UPF 108, according to an embodiment of the present disclosure.

Referring to FIG. 9, in operation 901, the SMF 104 and the UPF 108 may perform the N4 association setup procedure, as described with reference to FIG. 4. In the N4 association setup procedure, which may be initiated by the SMF 104 and/or the UPF 108, the UPF 108 may transmit information (e.g., the PFDM function and/or the BIDIR function) on the functions supported by the UPF 108 to the SMF 104 by including the information in an N4 association setup request message (e.g., in a case where the N4 association setup procedure is initiated by the UPF 108) and/or an N4 association setup response message (e.g., in a case where the N4 association setup procedure is initiated by the SMF 104).

In operation 902, the SMF 104 may identify whether a filter for the application is for an Uplink direction, a Downlink direction, or bi-directions, and/or may identify whether the filter may be applied in bi-directions. For example, in a case where the filter is pre-configured for bi-directions, or in a case where the filter for the Uplink direction and the filter for the Downlink direction have opposite sources and destinations, and other information (e.g., IP Protocol, IP address, Port) is the same, the SMF 104 may identify that the packet filter (or the packet filter for the Downlink direction) for the Uplink direction may be applied in bi-directions.

In operation 903, in a case where the SMF 104 identifies that the filter obtained in operation 901 may be applied in bi-directions, the SMF 104 may identify whether the UPF 108 supports the BIDIR function capable of deriving the filter for another direction from the filter for any one direction. For example, the SMF 104 may identify whether the UPF 108 supports the BIDIR function based on information on the functions supported by the UPF 108 received in the N4 association setup procedure with the UPF 108.

In a case where the SMF 104 identifies that the UPF 108 supports the BIDIR function in operation 903, in operation 904, the SMF 104 may identify (and/or generate, obtain) the PFD including the filter for any one direction and information (e.g., type information, indicator) that the filter may be applied in bi-directions. Here, the PFD may follow the format shown in Table 8.

In operation 905, the SMF 104 may transmit the identified PFD to the UPF 108 by including identified PFD in the PFD management request message.

In operation 906, the UPF 108 may identify whether the filter may be applied in bi-directions based on information (e.g., type information, indicator) included in the received PFD. For example, in a case where the received PFD includes the filter according to the format shown in Table 3, the UPF 108 may identify that the filter is a filter for single-direction that cannot be applied in bi-directions. Alternatively or additionally, in a case where the received PFD includes the filter according to the format shown in Table 8, the UPF 108 may identify that the filter may be applied in bi-directions.

In operation 907, in a case where the UPF 108 has identified that the received filter may only be applied in single-direction (e.g., Uplink direction or Downlink direction), the single-directional filter may be applied as a filter for detecting traffic of the application. Alternatively or additionally, in a case where the UPF 108 has identified that the received filter may be applied in bi-directions, the UPF 108 may derive the filter for another direction from the filter for any one direction, and may apply the two filters as filters for detecting traffic of the application.

In operation 908, the UPF 108 may transmit a PFD management response message including information indicating that the PFD management has succeeded to the SMF 104 in response to the PFD management request message received in operation 905.

In operation 909, the UPF 108 may perform an operation of detecting traffic of the application based on the identified filter. For example, the UPF 108 may identify whether traffic of the application matching the identified filter has generated.

In an embodiment, the UPF 108 may have received a PFD including bidirectional filters from which the UPF 108 may derive the filter for another direction from the received filter for any one direction. Consequently, a message length limitation problem may be addressed by preventing the inclusion of redundant information and/or information that may be derived from information included in message transmissions to the UPF 108. Furthermore, a network operator may set a larger number of filters for one application and may provide the PFD including a larger and/or more diverse set of filters to the UPF 108, so that a more efficient system may be implemented, when compared to related communication systems.

Figure 10:
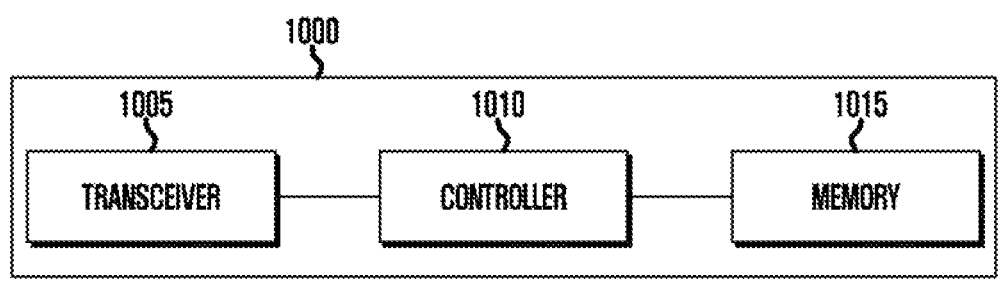
FIG. 10 is a diagram illustrating a structure of a network entity capable of performing SMF, according to an embodiment of the present disclosure.

FIG. 10 is a diagram illustrating a structure of a network entity capable of performing SMF, according to an embodiment of the present disclosure.

Referring to FIG. 10, the network entity 1000 may be capable of performing the SMF, according to an embodiment. That is, the network entity 1000 may include or may be similar in many respects to the SMF 104 described above with reference to FIGS. 1 to 9 and may include additional features not mentioned above. In an embodiment, the network entity 1000 may include a transceiver 1005, a controller 1010, and a memory 1015.

The transceiver 1005 may transmit and/or receive signals to and/or from another network entity. For example, the transceiver 1005 may transmit and/or receive signals to and/or from another network entity through a network interface such as a cable and the like. For example, the transceiver may transmit system information to a base station of the RAN 107 and may transmit a synchronization signal or a reference signal.

The controller 1010 may control the overall operation of the SMF 104, according to the embodiment.

The memory 1015 may store at least one of information transmitted and received through the transceiver 1005 and information generated through the controller 1010.

The number and arrangement of components of the network entity 1000 shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Alternatively or additionally, a set of (one or more) components shown in FIG. 10 may be integrated with each other, and/or may be implemented as an integrated circuit, as software, and/or a combination of circuits and software.

Figure 11:
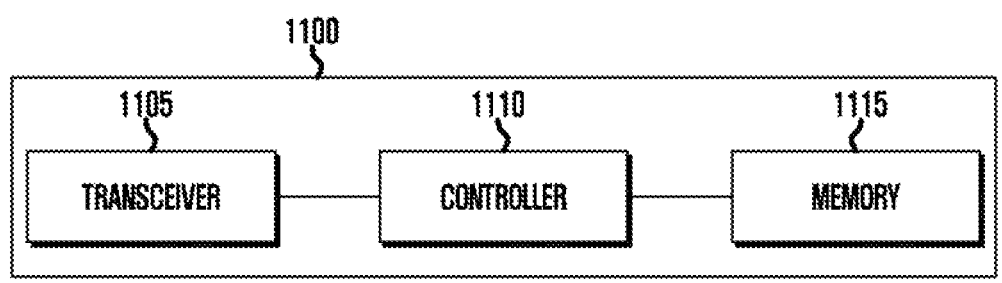
FIG. 11 is a diagram illustrating a structure of a network entity capable of performing UPF, according to an embodiment of the present disclosure.

FIG. 11 is a diagram illustrating a structure of a network entity capable of performing UPF, according to an embodiment of the present disclosure.

Referring to FIG. 11, the network entity 1100 capable of performing UPF, according to an embodiment. That is, the network entity 1100 may include or may be similar in many respects to the UPF 108 described above with reference to FIGS. 1 to 9 and may include additional features not mentioned above. In an embodiment, the network entity 1100 may include a transceiver 1105, a controller 1110, and a memory 1115.

The transceiver 1105 may transmit and/or receive signals to and/or from another network entity. For example, the transceiver 1105 may transmit and/or receive signals to and/or from another network entity through a network interface such as, but not limited to, a cable and the like. For example, the transceiver may transmit system information to a base station and/or may transmit a synchronization signal or a reference signal.

The controller 1110 may control the overall operation of the UPF 108, according to an embodiment.

The memory 1115 may store at least one of information transmitted and received through the transceiver 1105 and information generated through the controller 1110.

The number and arrangement of components of the network entity 1100 shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Alternatively or additionally, a set of (one or more) components shown in FIG. 11 may be integrated with each other, and/or may be implemented as an integrated circuit, as software, and/or a combination of circuits and software.

The methods proposed in the present disclosure may be executed by combining some or all of the content included in each embodiment within the scope of the present disclosure without impairing the essence of the present disclosure.

It is to be understood that the embodiments of the present disclosure are merely examples provided to explain the technical content of the present disclosure and help understand the present disclosure, and are not intended to limit the scope of the present disclosure. That is, it is understood that a person having ordinary knowledge in the technical field to which the present disclosure belongs may implement modified examples based on the technical idea of the present disclosure without departing from the scope of the present disclosure.

What is claimed is:

1. A method of a first network entity performing a session management function (SMF) in a communication system, comprising:

obtaining a first filter for a first direction and a second filter for a second direction, the first filter and the second filter being associated with an application;

identifying whether the first filter is a bidirectional filter based on a result of comparing the first filter and the second filter;

identifying whether a second network entity performing a user plane function (UPF) supports a function of obtaining the second filter, based on the first filter being identified as the bidirectional filter; and transmitting, to the second network entity, a first message comprising the first filter and information indicating that the first filter is the bidirectional filter, based on identifying that the second network entity supports the function of obtaining the second filter.

2. The method of claim 1, further comprising:

transmitting, to the second network entity, an association setup request message; and receiving, from the second network entity in response to the association setup request message, an association setup response message comprising functional information of the second network entity, wherein the functional information indicates whether the second network entity supports the function of obtaining the second filter.

3. The method of claim 1, further comprising:

determining, based on the result of the comparing of the first filter and the second filter, that first source information and first destination information of the first filter respectively correspond to second source information and second destination information of the second filter; and identifying that the first filter is the bidirectional filter based on the determining, wherein the second filter has been obtained by the second network entity based on the first filter being identified as the bidirectional filter, and wherein the first filter and the second filter are configured to detect traffic of the application.

4. The method of claim 1, further comprising:

transmitting, to the second network entity, a second message comprising the first filter and the second filter, based on the first filter not being identified as the bidirectional filter.

5. The method of claim 1, further comprising:

transmitting, to the second network entity, a second message comprising the first filter and the second filter to the second network entity, based on identifying that the second network entity does not support the function of obtaining the second filter.

6. A method of a second network entity performing a user plane function (UPF) in a communication system, comprising:

receiving a first message comprising a first filter for a first direction associated with an application from a first network entity performing a session management function (SMF);

identifying a second filter for a second direction based on information of the first filter, based on the first message indicating that the first filter is a bidirectional filter; and detecting traffic of the application based on the first filter and the second filter.

7. The method of claim 6, further comprising:

receiving, from the first network entity, an association setup request message; and transmitting, to the first network entity in response to the association setup request message, an association setup response message comprising functional information of the second network entity, wherein the functional information indicates that the second network entity supports a function of identifying the second filter based on the first filter.

8. The method of claim 6, wherein:

the first filter has been identified as the bidirectional filter based on a determination, based on a result of a comparison of the first filter and the second filter, that first source information and first destination information of the first filter respectively correspond to second source information and second destination information of the second filter, wherein the second filter has been obtained by the second network entity based on the first filter being identified as the bidirectional filter, and wherein the first filter and the second filter are configured to detect the traffic of the application.

9. The method of claim 6, further comprising:

receiving, from the first network entity, a second message comprising the first filter and the second filter, based on the first filter not being identified as the bidirectional filter.

10. The method of claim 6, wherein the detecting of the traffic of the application comprises identifying whether the traffic matches at least one of the first filter and the second filter.

11. A first network entity that performs a session management function (SMF) in a communication system, the first network entity comprising:

a transceiver; and a controller controlling the transceiver, wherein the controller is configured to:

obtain a first filter for a first direction and a second filter for a second direction, the first filter and the second filter being associated with an application;

identify whether the first filter is a bidirectional filter based on a result of comparing the first filter and the second filter;

identify whether a second network entity performing a user plane function (UPF) supports a function of obtaining the second filter, based on the first filter being identified as the bidirectional filter; and transmit, to the second network entity, a first message comprising the first filter and information indicating that the first filter is the bidirectional filter, based on identification that the second network entity supports the function of obtaining the second filter.

12. The first network entity of claim 11, wherein the controller is further configured to:

transmit, via the transceiver to the second network entity, an association setup request message; and receive, via the transceiver from the second network entity in response to the association setup request message, an association setup response message comprising functional information of the second network entity, wherein the functional information indicates whether the second network entity supports the function of obtaining the second filter.

13. The first network entity of claim 11, wherein the controller is further configured to:

determine, based on the result of comparing of the first filter and the second filter, that first source information and first destination information of the first filter respectively correspond to second source information and second destination information of the second filter; and identify that the first filter is the bidirectional filter based on the determination, wherein the second filter has been obtained by the second network entity based on the first filter having been identified as the bidirectional filter, and wherein the first filter and the second filter are configured to detect traffic of the application.

14. The first network entity of claim 11, wherein the controller is further configured to:

transmit, via the transceiver to the second network entity, a second message comprising the first filter and the second filter, based on the identification that the first filter is not the bidirectional filter.

15. The first network entity of claim 11, wherein the controller is further configured to:

transmit, via the transceiver to the second network entity, a second message comprising the first filter and the second filter, based on the identification that the second network entity does not support the function of obtaining the second filter.

16. A second network entity performing a user plane function (UPF) in a communication system, comprising:

a transceiver; and a controller controlling the transceiver, wherein the controller is configured to:

receive, via the transceiver, a first message comprising a first filter for a first direction associated with an application from a first network entity performing a session management function (SMF);

identify a second filter for a second direction based on information of the first filter, based on the first message indicating that the first filter is a bidirectional filter; and detect traffic of the application based on the first filter and the second filter.

17. The second network entity of claim 16, wherein the controller is further configured to:

receive, from the first network entity, an association setup request message; and transmit, to the first network entity in response to the association setup request message, an association setup response message comprising functional information of the second network entity, wherein the functional information indicates that the second network entity supports a function of identifying the second filter based on the first filter.

18. The second network entity of claim 16, wherein:

the first filter has been identified as the bidirectional filter based on a determination, based on a result of a comparison of the first filter and the second filter, that first source information and first destination information of the first filter respectively correspond to second source information and second destination information of the second filter, wherein the second filter has been obtained by the second network entity based on the first filter being identified as the bidirectional filter, and wherein the first filter and the second filter are configured to detect the traffic of the application.

19. The second network entity of claim 16, wherein the controller is further configured to:

receive, from the first network entity, a second message comprising the first filter and the second filter, based on the first filter not being identified as the bidirectional filter.

20. The second network entity of claim 16, wherein the controller is further configured to identify whether the traffic matches at least one of the first filter and the second filter.

* * * * *